United States Patent [19]

Ema

[11] 4,234,610

[45] Nov. 18, 1980

[54] METHOD OF REMOVING OFFENSIVE ODOR FROM THE MEAT OF SHARKS

[76] Inventor: Ichiro Ema, 6-6, Nipponbashi higashi 3-chome, Naniwa-ku, Osaka-shi, Osaka-fu, Japan

[21] Appl. No.: 45,263

[22] Filed: Jun. 4, 1979

[30] Foreign Application Priority Data

May 11, 1979 [JP] Japan .................................. 54-59461

[51] Int. Cl.³ ............................................... A23L 3/26
[52] U.S. Cl. ...................................... 426/248; 426/332; 426/393; 426/437; 426/486; 426/524; 426/643
[58] Field of Search ............... 426/248, 244, 246, 237, 426/524, 643, 431, 437, 332, 506, 486, 234, 397

[56] References Cited

U.S. PATENT DOCUMENTS

| | | | |
|---|---|---|---|
| 2,288,587 | 6/1942 | Kalischer | 426/244 |
| 2,564,487 | 8/1951 | Mader et al. | 426/643 |

FOREIGN PATENT DOCUMENTS

| | | | |
|---|---|---|---|
| 12836 | of 1907 | United Kingdom | 426/248 |
| 23194 | of 1915 | United Kingdom | 426/524 |
| 456994 | 11/1936 | United Kingdom | 426/524 |
| 945038 | 12/1963 | United Kingdom | 426/643 |

OTHER PUBLICATIONS

Taylor, *Refrigeration of Fish*, "Acquisition of Undesirable Odors," pp. 526 and 527, 1926.

*Primary Examiner*—Raymond N. Jones
*Assistant Examiner*—George C. Yeung
*Attorney, Agent, or Firm*—Wenderoth, Lind & Ponack

[57] ABSTRACT

A method of removing offensive odor from the meat of sharks, including the steps of immersing slices of the shark meat in a saline solution and allowing the immersed slices to stand for hours under exposure to scattered light. After discarding the saline solution, the slices of meat are further allowed to stand for hours under exposure to scattered light.

9 Claims, No Drawings

METHOD OF REMOVING OFFENSIVE ODOR FROM THE MEAT OF SHARKS

BACKGROUND OF THE INVENTION

A. Field of the Invention

The present invention relates to a method of removing offensive ammoniac odor from the meat of sharks.

B. Description of the Prior Art

In contrast with the odorless meat of some species of sharks such as a dogfish (*Squalus suckleyi*) and angelfish, the meat of the majority species of sharks such as a Port Jackson shark, saw shark (*Pristiophorus japonicus*), requiem shark (*Carcharhinus gangeticus*) and hammerhead shark begins to give out strong ammoniac odor immediately after death. Because of this unpleasant odor, the use of these sharks has so far been restricted within narrow ranges. Apart from the fins of these sharks which are dried and used as material for Chinese dishes, the only use of these sharks for food has been to boil the meat of these sharks while it is very fresh and make it into fish-paste products, and the only use of the livers of these sharks has been to make liver oil therefrom. All the attempts made in finding new uses for the meat of these sharks have met with failure. By way of example, the strong ammoniac odor could not be kept down even when the fresh meat of these sharks was put up in cans.

The strong ammoniac odor given out by the meat of these sharks is not attributable to the proteolysis caused by putrefaction but to the dissolution of nonprotein nitrogenous compounds, especially urea and trimethylamine oxides, which are contained in larger quantities in the meat of these sharks than in the meat of other odorless sharks or fishes other than sharks.

SUMMARY OF THE INVENTION

It is an object of the present invention to provide a method of removing offensive odor from the meat of sharks by removing nonprotein nitrogenous compounds from such meat.

It is another object of the present invention to provide a method of removing offensive odor from the meat of sharks without resort to any specific chemicals.

With these objects in view, the present invention will be more clearly understood from the following detailed description.

The meat of a shark is cut into slices so that each slice will have a thickness of about 3 cm at the most and weigh about 200 to 350 g. Processing in accordance with the present invention will have little effect on a slice of meat having a thickness in excess of about 3 cm. Each slice is wrapped up in a polyethylene or saran film or put into a polyethylene or saran bag for freezing.

The slices of meat are preferably frozen at −20° to −30° C. over a period of about 2 months, although they may be kept at 0° to −40° C. as is the case with ordinary freezing.

Although a part of the matter causing ammoniac odor is eliminated by this freezing, most of such matter still remains in the tissue of the meat.

After the slices of meat have been frozen, each of them is immersed in a saline solution prepared by dissolving 25 to 40 g of salt (containing 99% or more of sodium chloride) in about 1 liter of water and contained in a transparent vessel which is preferably colorless or light-blue. Then the vessel is covered with a wrapping film, sealed up, and allowed to stand at about 5° to 10° C. for about 10 to 16 hours.

Either rock salt or sea salt may be used for preparing the saline solution. Less than 25 g of salt dissolved in about 1 liter of water would have little effect. On the other hand, more than 40 g of salt dissolved in about 1 liter of water would make the meat too salty to be fit for cooking. It appears that the intracellular matter causing ammoniac odor is eliminated from the cellular tissue by osmosis. In order to allow the photochemical reaction to continue in a moderate degree, the slice of meat immersed in the saline solution is exposed to the light of a fluorescent lamp scattered by passage through a white synthetic resin sheet or the like. The object of maintaining the temperature of the meat at 5° to 10° C. during the immersion and subsequent processes is to preserve the meat from decay.

After the slice of meat immersed in the saline solution has been allowed to stand at about 5° to 10° C. for about 10 to 16 hours, the saline solution is discarded. Then the vessel containing the slice of meat alone is covered with a new wrapping film, sealed up, and allowed to stand at about 5° to 10° C. for about 8 to 12 hours under exposure to the scattered light as aforementioned.

After removing dark yellow fluid which oozes out of the meat during this second period of exposure to the scattered light, the vessel is covered with a new wrapping film, sealed up, and again allowed to stand at about 5° to 10° C. for about 12 to 16 hours under exposure to the scattered light. This time, dark yellow fluid will not ooze out of the meat in so large a quantity as before.

Each time the wrapping film is replaced with a new one in the aforementioned process, fresh air is newly confined in the wrappings, acts to gradually oxidize ammonia which occurs naturally as a product of decomposition of organic matter in the meat, and serves to deodorize the meat.

In order to wash away bad-smelling matter from the surface of the meat in the last step of the process in accordance with the present invention, the slices of meat are washed for about an hour in clear water preferably kept at 5° to 10° C.

As a matter of course, the meat of sharks deodorized by the method of the present invention should preferably be kept in cold storage (preferably at 3° to 4° C.) either as it is or after canning, so that it will be preserved from decay. Since there is no possibility that the meat of sharks thus processed may come to give out ammoniac odor again, it can be used for cooking either as it is or after making it into fish-paste products. For example, after being broiled with salt, cooked a la meuniere, fried, and stewed in white sauce, it was served successfully at a sampling party, in spite of an accepted opinion that it is impossible to cook the meat of sharks in these ways. These sample dishes did not give any unpleasant feeling to those who tried them, and there was no conflicting opinion concerning the daintiness of the sample dishes. Thus the method according to the present invention serves to remarkably expand the range of uses for the meat of sharks and thereby permits efficient use of one of the abundant marine resources rich in albuminous substances. Further, the present invention does not raise any question about food sanitation, because no chemicals other than sodium chloride are used.

THE PREFERRED EMBODIMENTS

The following example demonstrates preferred conditions for the process in accordance with the present invention:

A slice cut from the meat of a requiem shark (*Carcharhinus gangeticus*) to a thickness of 2.5 cm and a weight of about 300 g was put into a polyethylene bag and stored at −20° C. over a period of about 2 months. Then the slice of meat was immersed in a saline solution prepared by dissolving 30 g of salt in about 1,000 cc of water. The glass vessel containing the saline solution and the slice of meat was covered with a wrapping film, sealed up, and allowed to stand at 6° to 7° C. for 14 hours under exposure to the light of a fluorescent lamp (110V, 20W) scattered by passage through a white synthetic resin sheet. The fluorescent lamp was one of those manufactured for use in the refrigerators by Matsushita Electric Industrial Co., Ltd. of Japan and marketed under the brand of "Metro". After 14-hour immersion, the saline solution was discarded. Then the vessel containing the slice of meat alone was covered with a new wrapping film, sealed up, and allowed to stand at 6° to 7° C. for about 10 hours under exposure to the scattered light as aforementioned. After removing dark yellow fluid which oozed out of the meat during this second period of exposure to the scattered light, the vessel was covered with a new wrapping film, sealed up, and again allowed to stand at 6° to 7° C. for about 14 hours under exposure to the scattered light. Then the slice of meat was taken out from the vessel and washed in clear water for about an hour. When the meat thus processed was stewed in white sauce, it was found to be extremely dainty and completely free of not only ammoniac odor but also other unpleasant odor peculiar to the meat of sharks.

While I have disclosed an example of the present invention, it is to be understood that it has been given by way of example only and not in a limiting sense, the scope of the present invention being determined by the objects and the claims.

I claim:

1. A method of removing offensive odor from the meat of sharks, comprising the steps of cutting the meat of a shark into slices, wrapping each of the slices in a wrapping film, immersing said slices in a saline solution, allowing them to stand at temperatures, low enough to preserve the shark meat from decay, for several hours under exposure to scattered light produced by permitting light from an electric light source to pass through a synthetic resin sheet, discarding said saline solution, further allowing said slices to stand at a low temperature of about 5°–10° C. for at least 8 hours under exposure to said scattered light, removing said wrapping film from said slices, and washing said slices in clear water.

2. A method of removing odor from the meat of sharks, comprising the steps of cutting the meat of a shark into slices, wrapping each of the slices in a wrapping film, immersing said slices in a saline solution, allowing said immersed slices to stand at 5° to 10° C. for about 10 to 16 hours under exposure to scattered light produced by permitting light from an electric light source to pass through a synthetic resin sheet, discarding said saline solution, allowing said saline treated slices to stand at 5° to 10° C. for about 8 to 12 hours under exposure to said scattered light, removing the dark yellow fluid which oozes out of said slices during said second period of exposure to said scattered light, allowing said slices from said second exposure to stand at 5° to 10° C. for about 12 to 16 hours under exposure to said scattered light, removing the wrapping film from said slices and washing said slices in clear water.

3. The method as set forth in claim 1 or 2, wherein the slices are put in a wrapping bag instead of being wrapped up in a film.

4. The method as set forth in claim 1 or 2, wherein each of said slices has a thickness of 3 cm or less and weighs about 200 to 350 g.

5. The method as set forth in claim 1 or 2, wherein said film wrapping is made of polyethylene or saran.

6. The method as set forth in claim 1 or 2, wherein the untreated slices are frozen at −20° to −30° C. over a period of about 2 months.

7. The method as set forth in claim 1 or 2, wherein said saline solution is prepared by dissolving 25 to 40 g of either rock salt or sea salt containing 99% or more of sodium chloride in about 1 liter of water.

8. The method as set forth in claim 1 or 2, wherein said scattered light is obtained by allowing the light of a fluorescent lamp to pass through a white synthetic resin sheet.

9. The method as set forth in claim 1 or 2, wherein the last step is washing said slices for about an hour in clear water kept at 5° to 10° C.

* * * * *

UNITED STATES PATENT AND TRADEMARK OFFICE
CERTIFICATE OF CORRECTION

PATENT NO. : 4,234,610

DATED : November 18, 1980

INVENTOR(S) : ICHIRO EMA

It is certified that error appears in the above-identified patent and that said Letters Patent are hereby corrected as shown below:

Col. 1, line 64, before "immersed" please insert -- unwrapped and --.

Cols. 3 and 4, amend the claims to read as follows:

1. A method of removing offensive odor from the meat of sharks, comprising the steps of cutting the meat of a shark into slices, immersing said slices in a saline solution contained in a vessel, covering and sealing the vessel with a wrapping film, allowing the immersed slices to stand at temperatures low enough to preserve the shark meat from decay for several hours under exposure to scattered light produced by permitting light from an electric light source to pass through a synthetic resin sheet, removing the wrapping film, discarding said saline solution, covering the vessel with a new wrapping film and further allowing said slices to stand at a low temperature of about 5-10°C for at least 8 hours under exposure to said scattered light, removing said wrapping film from said vessel and washing said slices in clear water.

2. A method of removing odor from the meat of sharks, comprising the steps of cutting the meat of a shark into pieces, immersing said slices in a saline solution contained in a vessel, covering and sealing the vessel with a wrapping film, allowing said immersed slices to stand at 5 to 10°C for about 10 to 16 hours under exposure to scattered light produced by permitting light from an electric light source to pass through a synthetic resin sheet, removing the wrapping film, discarding said saline solution, covering and sealing the vessel with a new wrapping film, allowing said saline treated slices to stand at 5 to 10°C for about 8 to 12 hours under exposure to said scattered light, removing the wrapping film and removing the dark yellow fluid which oozes out of said slices during said second period of exposure to said scattered light, covering

UNITED STATES PATENT AND TRADEMARK OFFICE
CERTIFICATE OF CORRECTION

PATENT NO. : 4,234,610
DATED : November 18, 1980
INVENTOR(S) : ICHIRO EMA

It is certified that error appears in the above-identified patent and that said Letters Patent are hereby corrected as shown below:

and sealing the vessel with another wrapping film, allowing said slices from said second exposure to stand at 5 to 10°C for about 12 to 16 hours under exposure to said scattered light, removing the wrapping film from said vessel and washing said slices in clear water.

3. The method as set forth in claim 1 or 2, wherein each of said slices has a thickness of 3 cm or less and weighs about 200 to 350 g.

4. The method as set forth in claim 1 or 2, wherein the untreated slices are frozen at -20° to -30°C over a period of about 2 months.

5. The method as set forth in claim 1 or 2, wherein said saline solution is prepared by dissolving 25 to 40 g of either rock salt or sea salt containing 99% or more of sodium chloride in about 1 liter of water.

6. The method as set forth in claim 1 or 2, wherein said scattered light is obtained by allowing the light of a fluorescent lamp to pass through a white synthetic resin sheet.

7. The method as set forth in claim 1 or 2, wherein the last step is washing said slices for about an hour in clear water kept at 5° to 10° C.

8. The method as set forth in claim 1 or 2, wherein after the meat of the shark is cut into slices, each of said slices is wrapped in a film or bag, frozen, and just prior to immersion in the saline solution, said slices are unwrapped and then treated in said saline solution.

UNITED STATES PATENT AND TRADEMARK OFFICE
CERTIFICATE OF CORRECTION

PATENT NO. : 4,234,610
DATED : November 18, 1980
INVENTOR(S) : ICHIRO EMA

It is certified that error appears in the above-identified patent and that said Letters Patent are hereby corrected as shown below:

9. The method as set forth in claim 8 wherein said film or bag is made of polyethylene or saran.

Signed and Sealed this

Eighth Day of September 1981

[SEAL]

Attest:

GERALD J. MOSSINGHOFF

Attesting Officer

Commissioner of Patents and Trademarks